United States Patent
Noguchi

(10) Patent No.: US 9,329,094 B2
(45) Date of Patent: May 3, 2016

(54) IMPACT DETECTION APPARATUS

(71) Applicant: KYOCERA Document Solutions Inc., Osaka-shi, Osaka (JP)

(72) Inventor: Yohei Noguchi, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 231 days.

(21) Appl. No.: 14/226,207

(22) Filed: Mar. 26, 2014

(65) Prior Publication Data
US 2014/0290561 A1     Oct. 2, 2014

(30) Foreign Application Priority Data
Mar. 29, 2013   (JP) .................................. 2013-075131

(51) Int. Cl.
*G01L 5/00* (2006.01)
*G01P 15/06* (2006.01)
*B65D 79/02* (2006.01)

(52) U.S. Cl.
CPC .............. *G01L 5/0052* (2013.01); *B65D 79/02* (2013.01); *G01P 15/06* (2013.01)

(58) Field of Classification Search
CPC ........ B65D 79/02; G01L 5/00; G01L 5/0052; G01P 15/03; G01P 15/032; G01P 15/036; G01P 15/038; G01P 15/04; G01P 15/06; G01P 15/18
USPC ..................................... 116/203, 215; 73/492
See application file for complete search history.

(56) References Cited

U.S. PATENT DOCUMENTS

| | | | | |
|---|---|---|---|---|
| 2,601,440 | A * | 6/1952 | Kerrigan ................ | B65D 79/02 116/203 |
| 6,367,408 | B1 * | 4/2002 | Gu ......................... | B65D 79/02 116/203 |

(Continued)

FOREIGN PATENT DOCUMENTS

| JP | 54136878 A | * | 10/1979 | .............. G01P 15/04 |
|---|---|---|---|---|
| JP | 2004206823 A | * | 7/2004 | .............. G01P 15/06 |

(Continued)

OTHER PUBLICATIONS

Cited documents for JP 2014199224 A as provided by Espacenet on Jan. 6, 2016, two pages.*

*Primary Examiner* — Richard A. Smith
(74) *Attorney, Agent, or Firm* — Alleman Hall McCoy Russell & Tuttle LLP

(57) ABSTRACT

An impact detection apparatus according to one aspect of the present disclosure includes first and second detection portion, and connection portion. First and second detection portion each include solution container, solution absorption portion, mount-surface portion, and exterior portion. Solution container is configured to store colored solution therein, and has outlet enabling colored solution to flow out when being subjected to pressing force. Solution absorption portion is capable of absorbing colored solution that has flowed out from the outlet. Exterior portion is disposed on mount-surface portion, forms, together with mount-surface portion therebetween, housing space housing solution container and solution absorption portion, and has transparent portion. When colored solution flows out from outlet of one of solution containers due to being subjected predetermined pressing force, colored solution is absorbed by one of solution absorption portions, and one of solution absorption portions colored by colored solution is visually recognized through transparent portion.

12 Claims, 9 Drawing Sheets

(56) References Cited

U.S. PATENT DOCUMENTS

| | | | | |
|---|---|---|---|---|
| 7,926,194 B2 * | 4/2011 | Katoh | ................ | B65D 79/02 116/203 |
| 8,671,582 B2 * | 3/2014 | Branch | ................ | G01C 9/10 116/215 |
| 2013/0017609 A1 * | 1/2013 | Kansakoski | ......... | B65D 55/026 436/1 |

FOREIGN PATENT DOCUMENTS

| | | | | | |
|---|---|---|---|---|---|
| JP | 2006117268 | A | * | 5/2006 | .............. G01P 15/06 |
| JP | 2008010078 | A | * | 1/2008 | .............. G01P 15/06 |
| JP | 2010085132 | A | | 4/2010 | |
| JP | 2014235000 | A | * | 12/2014 | .............. G01P 15/00 |
| WO | WO 2008060003 | A1 | * | 5/2008 | .............. B65D 79/02 |
| WO | WO 2014152613 | A1 | * | 9/2014 | .............. G01P 15/06 |

\* cited by examiner

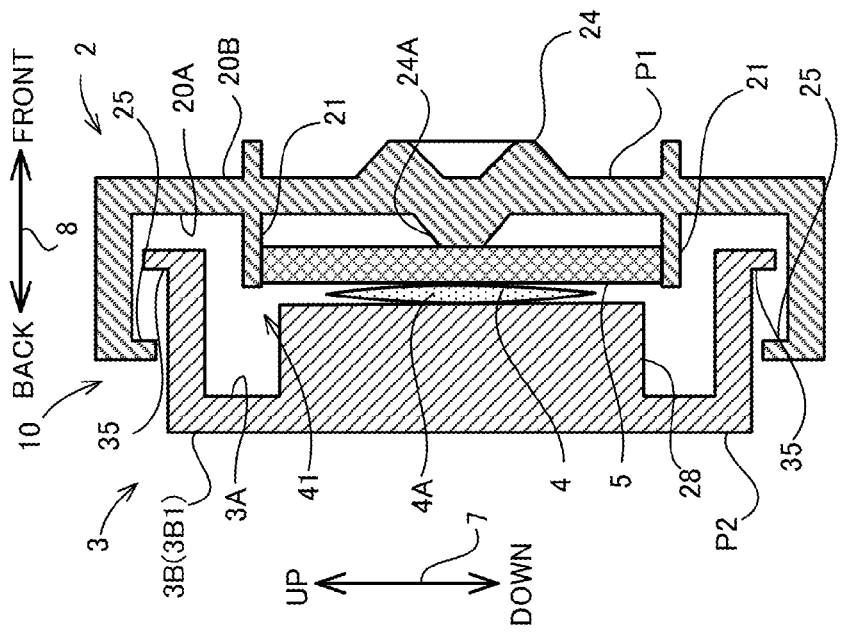
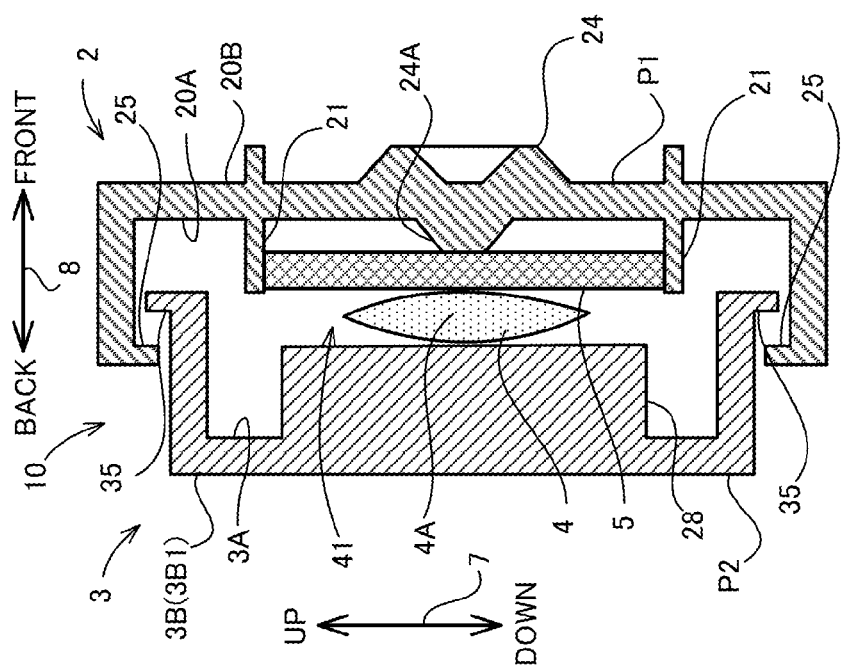

IMPACT DETECTION APPARATUS

INCORPORATION BY REFERENCE

This application is based upon and claims the benefit of priority from the corresponding Japanese Patent Application No. 2013-075131 filed on Mar. 29, 2013, the entire contents of which are incorporated herein by reference.

BACKGROUND

The present disclosure relates to an impact detection apparatus that enables visual confirmation of a package box being subjected to an impact.

Generally, when packaging electronic equipment in a package box such as a cardboard box for transportation, buffer materials are provided around the packed electronic equipment for protecting the electronic equipment from impact and vibration. However, when large and heavy electronic equipment such as a multifunctional peripheral or a personal computer is packed in the package box and transported, the buffer material covering the surroundings of the electronic equipment cannot fully absorb an impact if the packaged body tumbles during transportation. As a result, there are cases where malfunction occurs to electronic equipment subjected to an impact. In addition, the trace of malfunction may not appear on the exterior of the electronic equipment due to the malfunction occurring inside the electronic equipment. Therefore, even if a malfunction has occurred to transported electronic equipment, the malfunction is not recognized until the electronic equipment is actually used.

A technology is known which enables visual confirmation of electronic equipment being subjected to a strong impact, more specifically, a technology of providing, as a buffer material, a holding portion filled with a supersaturated solution. When the buffer material is subjected to an impact, the filled solution crystallizes and changes its color tone. Therefore, a customer can visually confirm whether the electronic equipment wrapped with the buffer material has been subjected to an impact at a certain level or stronger to cause malfunction.

However, with the hitherto known buffer material, it is not possible to confirm that the electronic equipment has been subjected to an impact until the package box is opened. Therefore, even if the electronic equipment has been subjected to an impact, the packaged body will be received without being able to know the presence or absence of the impact.

SUMMARY

An impact detection apparatus according to one aspect of the present disclosure includes a first detection portion and a second detection portion mounted at a corner portion of a mounting target along two adjacent lateral surfaces, a connection portion. The first detection portion and the second detection portion each include a solution container, a solution absorption portion, a mount-surface portion, and exterior portion. The solution containers is configured to store a colored solution therein, and has an outlet enabling the colored solution to flow out when being subjected to a predetermined pressing force. The solution absorption portions is capable of absorbing the colored solution that has flowed out from the outlet. The mount-surface portion is mounted on one of the lateral surfaces. The exterior portion is disposed on each of the mount-surface portions, forms, together with each of the mount-surface portions therebetween, a housing space housing the solution container and the solution absorption portion, and has a transparent portion at at least one part thereof. The connection portion connects the respective mount-surface portions of the each the first detection portion and the second detection portion at a predetermined angle. The exterior portions are formed to be capable of changing states between a first state in which the predetermined pressing force is not applied on the solution containers when not being subjected to external force, and a second state in which the predetermined pressing force is applied on the solution containers when being subjected to the external force. The colored solution that has flowed out from the outlet of one of the solution containers due to being subjected the predetermined pressing force in the second state is absorbed by one of the solution absorption portions, and the one of the solution absorption portions colored by the colored solution is visually recognized through the transparent portion.

A packaged body according to another aspect of the present disclosure includes a package box used as the mounting target for packaging electronic equipment, and the impact detection apparatus mounted on the package box.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A and FIG. 3B are cross sectional views that schematically show cross-sectional structures as viewed from the direction of arrows A-A in FIG. 2A.

DETAILED DESCRIPTION

Figure 1:
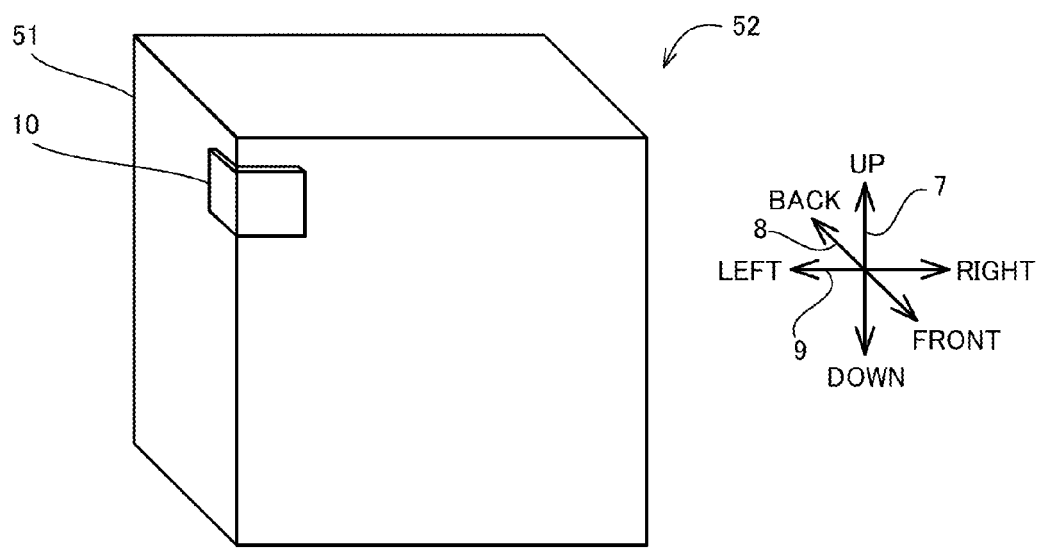
FIG. 1 is a perspective view that schematically shows a usage example in which an impact detection apparatus according to a first embodiment of the present disclosure is mounted on a cardboard box.

In the following, embodiments of the present disclosure will be described with reference to the accompanying drawings to enable understanding of the present disclosure. The embodiments described in the following are examples realizing the present disclosure, and do not limit the technical scope of the present disclosure. It should be noted that, for convenience of description, an up-down direction 7 is defined as a vertical direction when impact detection apparatuses 10 to 13 according to embodiments of the present disclosure are placed in a usable state (e.g., the state shown in FIG. 1), a front-back direction 8 is defined as a direction in which a later described first exterior portion P1 is disposed on the near side (front), and a right-left direction 9 is defined as a direction in which the first exterior portion P1 is facing the front.

First Embodiment

Usage Example of Impact Detection Apparatus 10

First, a usage example of an impact detection apparatus 10 according to a first embodiment of the present disclosure will be described with reference to FIG. 1.

As shown in FIG. 1, the impact detection apparatus 10 is mounted on a cardboard box 51 (one example of a mounting target) used as a package for electronic equipment such as a multifunctional peripheral, a printer, or a scanner. When a packaged body 52, which is the electronic equipment packaged by the cardboard box 51, is subjected to an impact due to causes such as tumbling during transport and colliding with the floor or a surrounding object, the impact detection apparatus 10 visually displays an impact mark. When the packaged body 52 tumbles, a part of the cardboard box 51 that is further upward is subjected to a larger impact. Therefore, the impact detection apparatus 10 is preferably mounted on an upper corner of the cardboard box 51. In the present embodiment, the impact detection apparatus 10 is mounted at at least two corners on a diagonal line of a plane when the cardboard box 51 is viewed from above. It should be noted that a transport worker often presses down a part near an upper corner of the cardboard box 51 by his/her hand when carrying the packaged body 52. Therefore, the impact detection apparatus 10 is mounted on a position that will not obstruct carrying and moving the cardboard box 51, more specifically, a position below the upper corner by a width of a hand, for example, a position approximately 10 cm to 15 cm below an upper corner of the cardboard box 51.

<Configuration of Impact Detection Apparatus 10>

In the following, the configuration of the impact detection apparatus 10 will be described with reference to FIGS. 2 to 5. As shown in FIGS. 2 to 4, the impact detection apparatus 10 includes an L-shaped housing 1, two ink bags 4 (one example of a solution container), and two absorbent bodies 5 (one example of a solution absorption portion). The housing 1 includes an L-shaped exterior case 2 having two surfaces, and an L-shaped mount-side case 3 having two surfaces. The housing 1 is formed by combining the exterior case 2 and the mount-side case 3. Since the housing 1 is formed from the exterior case 2 and the mount-side case 3, the exterior case 2 and the mount-side case 3 can be individually obtained through injection molding. Thus, manufacturing the housing 1 becomes easier than integrally forming the housing 1.

Figure 4A:
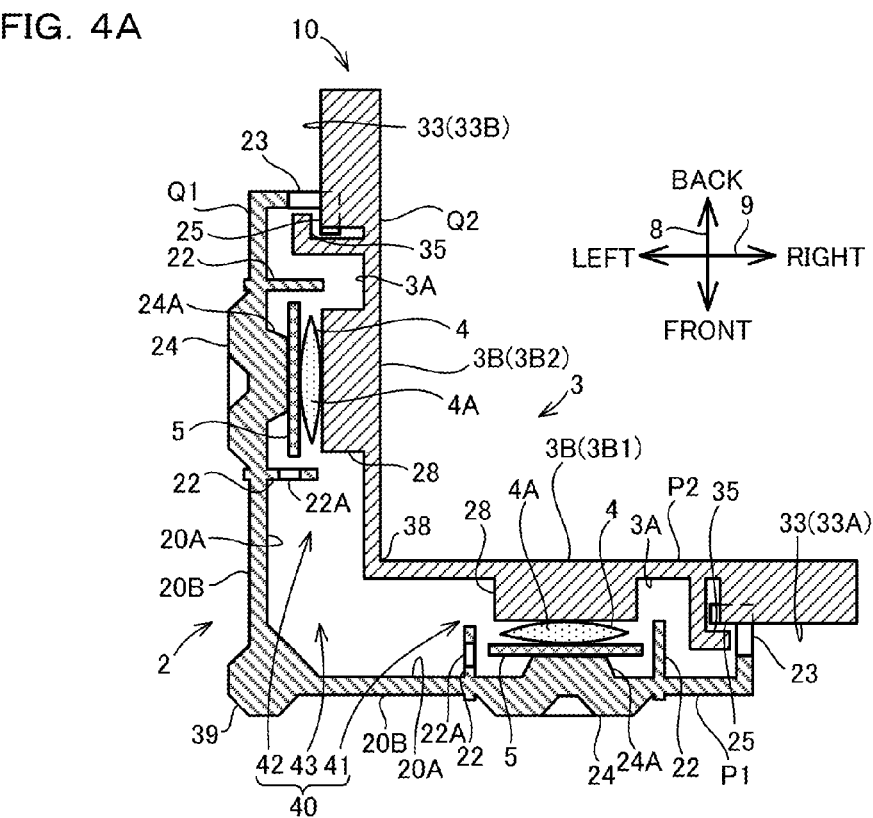
FIG. 4A and FIG. 4B are cross sectional views that schematically show cross-sectional structures as viewed from the direction of arrows B-B in FIG. 2B.
Figure 4B:
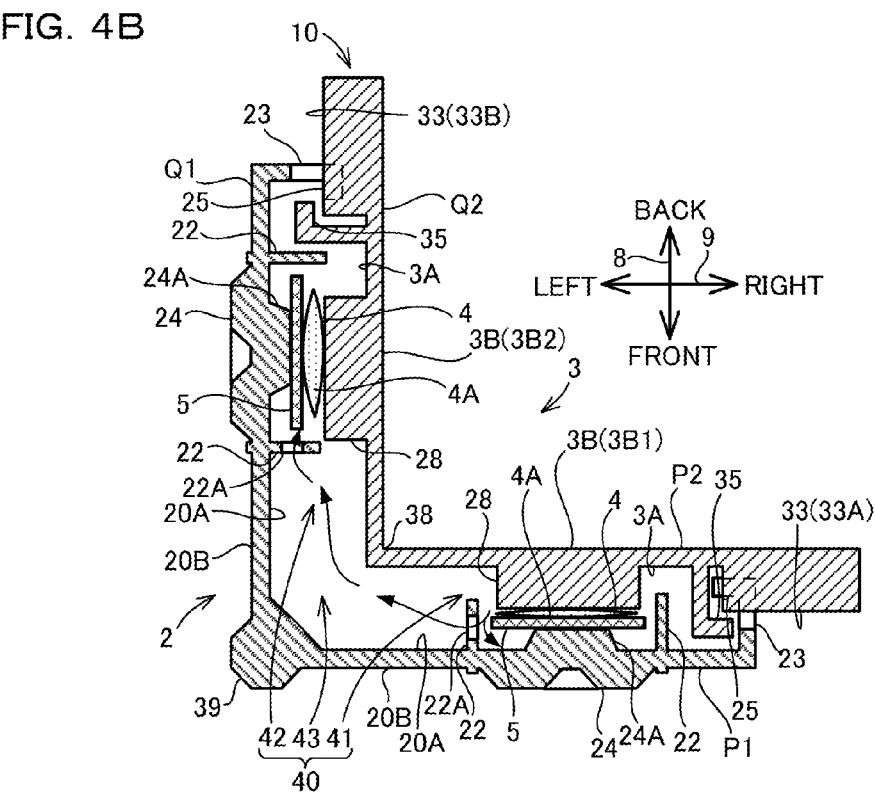

As shown in FIGS. 4A and 4B, a housing space 40 is formed inside the housing 1. More specifically, the housing space 40 is formed between an inner surface 3A of the mount-side case 3 and an inner surface 20A of the exterior case 2. The ink bags 4 and the absorbent bodies 5 are held in the housing space 40. In the present embodiment, the exterior case 2 is formed to be movable in a direction enabling attachment and detachment with respect to the mount-side case 3. In more detail, the exterior case 2 shifts between a first attitude in which a predetermined pressing force is not applied to compress the ink bags 4 in the housing space 40 (cf. FIGS. 3A and 4A), and a second attitude in which the predetermined pressing force is applied to compress the ink bags 4 (cf. FIGS. 3B and 4B). With such a configuration, for example, when the exterior case 2 takes the second attitude and the ink bags 4 is compressed, a seal of the compressed ink bags 4 breaks and an ink 4A held therein flows out, and the ink 4A is absorbed by the absorbent bodies 5. In the following, details of the exterior case 2 and the mount-side case 3 will be described.

Figure 2A:
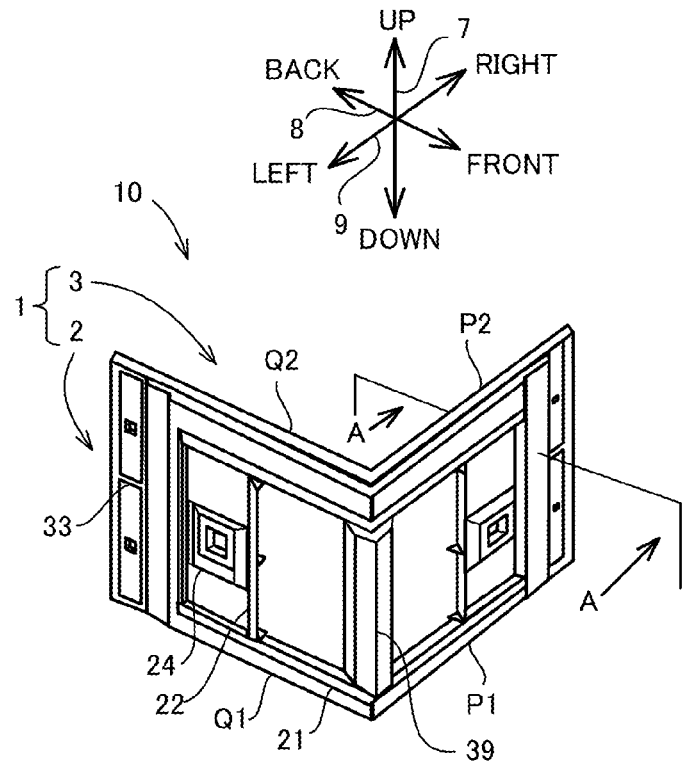
FIG. 2A is a perspective view that schematically shows an outlined configuration of the impact detection apparatus.

The mount-side case 3 is obtained through injection molding a synthetic resin or the like, and has a first mount portion P2 (one example of a mount-surface portion) and a second mount portion Q2 (one example of a mount-surface portion). The first mount portion P2 and the second mount portion Q2 are both parts that are mounted on the cardboard box 51. A first detection portion disclosed in the claims is achieved by the first mount portion P2, the ink bag 4, the absorbent body 5, and a later described first exterior portion P1 (one example of an exterior portion). A second detection portion disclosed in the claims is achieved by the second mount portion Q2, the ink bag 4, the absorbent body 5, and a later described second exterior portion Q1 (one example of an exterior portion). The first mount portion P2 and the second mount portion Q2 are connected by a connection portion 38 (one example of a connection portion) so as to form a predetermined angle. More specifically, the first mount portion P2 and the second mount portion Q2 are connected to each other so as to form an approximately right angle. Thus, the angle mutually formed by the first mount portion P2 and the second mount portion Q2 is approximately a right angle. With this, the mount-side case 3 having the L-shape in planar view is formed. As shown in FIGS. 2A and 4A, the first mount portion P2 is formed in a rectangular shape whose side in the right-left direction 9 is longer than the side in the up-down direction 7 when viewed from the front side. Furthermore, similarly to the first mount portion P2, the second mount portion Q2 is formed in a rectangular shape whose side in the front-back direction 8 is longer than the side in the up-down direction 7 when viewed from the left side surface. Since the mount-side case 3 is formed in such shape, the first mount portion P2 and the second mount portion Q2 of the housing 1 are mountable to a corner portion of two adjacent surfaces so as to span on the two surfaces on the cardboard box 51 having a rectangular parallelepiped shape. Thus, the first mount portion P2 and the second mount portion Q2 are mountable on two lateral surfaces that are adjacent at a corner portion of the cardboard box 51.

The housing space 40 is formed between the exterior case 2 and both the first mount portion P2 and the second mount portion Q2 of the mount-side case 3. The housing space 40 of the housing 1 is divided into a first compartment 41 (one example of a housing space) corresponding to the first mount portion P2 of the mount-side case 3, a second compartment 42 (one example of a housing space) corresponding to the second mount portion Q2, and a connection space 43. The first compartment 41 is formed between the first mount portion P2 and a later described first exterior portion P1 (one example of an exterior portion) corresponding to the first mount portion P2. Furthermore, the second compartment 42 is formed between the second mount portion Q2 and a later described second exterior portion Q1 (one example of an exterior portion) corresponding to the second mount portion Q2. The connection space 43 is a part that links and communicatively connects the first compartment 41 and the second compartment 42, and enables circulation of fluid such as the ink 4A within the ink bags 4, between the first compartment 41 and the second compartment 42 via the connection space 43. Each of the first compartment 41 and the second compartment 42 holds one of the ink bags 4 and one of the absorbent bodies 5. Thus, the first compartment 41 holds one of the ink bags 4 and one of the absorbent bodies 5, and the second compartment 42 separately holds one of the ink bags 4 and one of the absorbent bodies 5. As a result, when the impact detection apparatus 10 is mounted on two surfaces of the cardboard box 51, the impact detection apparatus 10 can detect impact on the two surfaces.

On the outer side of the mount-side case 3, a mount surface 3B which is mounted to the cardboard box 51 is formed. The mount surface 3B consists of a surface 3B1 located on the first mount portion P2 side and a surface 3B2 located on the second mount portion Q2 side. The surfaces 3B1 and 3B2 are both flat, and an adhesion material such as a double-sided tape is attached to both the surfaces 3B1 and 3B2. The surface 3B1 on the first mount portion P2 side is mounted on one surface of the cardboard box 51, and the surface 3B2 of the second mount portion Q2 is mounted on another surface adjacent to the one surface of the cardboard box 51.

On the inner surface 3A of the mount-side case 3, pressing portions 28, slide rails 33, and inner case guides 35 are integrally formed. As shown in FIG. 4, the pressing portions 28, the slide rails 33, and the inner case guides 35 are individually disposed on the first compartment 41 and the second compartment 42.

The pressing portions 28 are formed in a trapezoidal shape that protrudes inwards from the inner surface 3A. When the impact detection apparatus 10 is subjected to an impact and the exterior case 2 shifts from the later described first attitude (cf. FIGS. 3A and 4A) to the later described second attitude (cf. FIGS. 3B and 4B), the pressing portions 28 presses the ink bags 4 together with the exterior case 2. In the present embodiment, when the ink bags 4 are pressed by the pressing portions 28 and when the ink bags 4 are compressed, a seal of outlets 4B (cf. FIG. 5) of the ink bags 4 breaks. As a result, the ink 4A flows out from the outlets 4B of the ink bags 4. The ink bags 4 will be described later.

The slide rails 33 are rail-like grooves that guide later described slide guides 23 included in the exterior case 2 to one direction. As shown in FIG. 4, a slide rail 33A on the first mount portion P2 side is disposed on the right end part of the inner surface 3A of the first mount portion P2 and extends in the right-left direction 9. Furthermore, a slide rail 33B on the second mount portion Q2 side is disposed on the back end part of the inner surface 3A of the second mount portion Q2, and extends in the front-back direction 8. When the slide guides 23 are inserted in the slide rails 33, the exterior case 2 can move in a predetermined direction along the slide rails 33 with respect to the mount-side case 3.

The inner case guides 35 are formed in a wall shape bending inwards from a marginal part of the inner surface 3A. The inner case guides 35 and later described outer case guides 25 included in the exterior case 2 engage each other to movably support the exterior case 2 with respect to the mount-side case 3. As a result, as shown in FIGS. 4A and 4B, the exterior case 2 can slide in a direction enabling attachment and detachment with respect to the mount-side case 3. The front end parts of the inner case guides 35 are formed in a hook shape that is bent outwards. When the front end parts of the inner case guides 35 are caught at the front end parts of the later described outer case guides 25 included in the exterior case 2, the exterior case 2 becomes restricted from moving in a direction separating away from the mount-side case 3. As a result, the exterior case 2 is prevented from separating from the mount-side case 3.

The exterior case 2 is obtained through injection molding a synthetic resin or the like, and is, for example, a transparent case made from plastic. By forming the exterior case 2 with a transparent material, a transparent portion is achieved. The exterior case 2 is supported by the mount-side case 3 so as to cover the inner surface 3A of the mount-side case 3. The surface of the exterior case 2 is exposed when the mount-side case 3 is mounted on the cardboard box 51. The exterior case 2 is completely transparent. Therefore, it is possible to visually observe the inside state of the housing space 40 through the exterior case 2 from outside. Needless to say that it is sufficient when at least one portion of the exterior case 2 is transparent, and, in more detail, it is sufficient when a part that enables visual observation of the state of the absorbent bodies 5 is transparently formed.

Figure 2B:
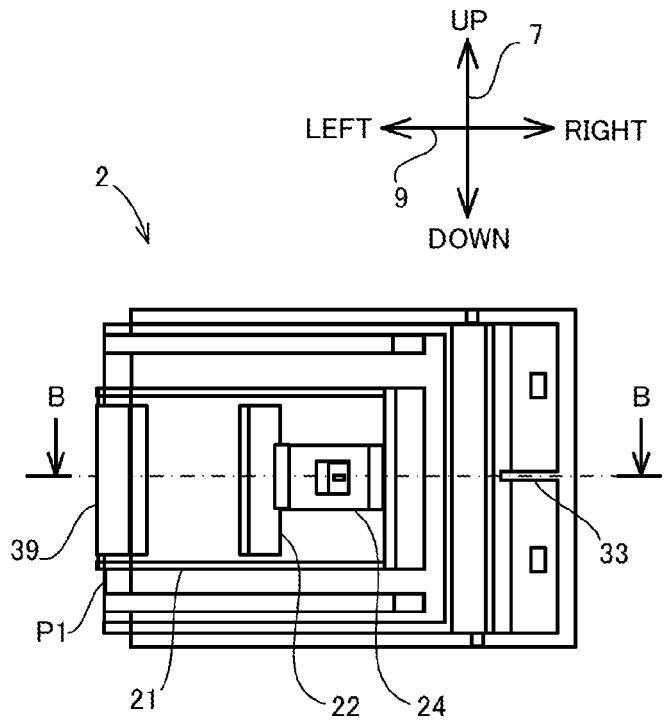
FIG. 2B is a front view that schematically shows an outlined configuration of the impact detection apparatus.

As shown in FIGS. 2A and 2B, the exterior case 2 includes the first exterior portion P1 corresponding to the first mount portion P2 and the second exterior portion Q1 corresponding to the second mount portion Q2. The first exterior portion P1 and the second exterior portion Q1 are connected by a connection portion 39 (one example of the connection portion). More specifically, the first exterior portion P1 and the second exterior portion Q1 are connected to each other so as to form an approximately right angle. As a result, together with the mount-side case 3, the housing 1 having an L-shaped in planar view is formed. As shown in FIG. 2B, the first exterior portion P1 is formed in a rectangular shape whose side in the right-left direction 9 the side in the up-down direction 7 is longer than when viewed from the front side. Furthermore, similarly to the first exterior portion P1, the second exterior portion Q1 is formed in a rectangular shape whose side in the front-back direction 8 is longer than the side in the up-down direction 7 when viewed from the left side surface.

On the inner surface 20A of the exterior case 2, first guides 21, second guides 22, the slide guides 23, inner projections 24A, and the outer case guides 25 are integrally formed. As shown in FIG. 4, the first guides 21, the second guides 22, the slide guides 23, the inner projections 24A, and the outer case guides 25 are individually disposed on the first compartment 41 and the second compartment 42.

The first guides 21 and the second guides 22 are provided for guiding the pressing portions 28. As shown in FIG. 3, the first guides 21 protrude inwards from the inner surface 20A, and are formed in a fence shape extendedly installed in the horizontal direction. The first guides 21 are disposed so as to form a pair at respective positions separated by a predetermined interval in the up-down direction 7. The second guides 22 protrude inwards from the inner surface 20A, and are formed in a fence shape extendedly installed in the up-down direction 7. The second guides 22 are disposed so as to form a pair at respective positions separated by a predetermined interval in the horizontal direction. When the exterior case 2 slides with respect to the mount-side case 3 as described later, each of the pressing portions 28 are guided by one pair of the first guides 21 and one pair of the second guides 22 to enter the interior space surrounded by the first guides 21 and the second guides 22. As described later, the ink bags 4 and the absorbent bodies 5 are held in this interior space.

Horizontal penetration holes 22A are formed on the second guides 22 on the connection space 43 side, and the penetration holes 22A are passages through which the ink 4A passes toward the connection space 43 when the ink 4A flows out from the ink bags 4 in the housing space 40. For example, when the ink bag 4 in the first compartment 41 of the first exterior portion P1 tears and the ink 4A flows out, the ink 4A passes through the penetration hole 22A in the first compartment 41, flows in the connection space 43, flows in the second exterior portion Q1 on the other side, passes through the penetration hole 22A in the second compartment 42, and reaches the absorbent body 5 to be absorbed.

The inner projections 24A are conical-shaped projections that protrude inwards from the inner surface 20A. The inner projections 24A protrude toward the interior space surrounded by one pair of the first guides 21 and one pair of the second guides 22. Thus, the inner projections 24A are disposed at positions facing the pressing portions 28.

The outer case guides 25 are formed in a wall shape that bends inwards from a marginal part of the inner surface 20A. The outer case guides 25 and the inner case guides 35 engage each other to movably support the exterior case 2 with respect to the mount-side case 3. More specifically, the outer case guides 25 are fitted on the outside of the inner case guides 35, and, by using lateral surfaces outside thereof as a guide surface, the exterior case 2 is supported so as to be able to slide in a direction enabling attachment and detachment with respect to the mount-side case 3. In the present embodiment, the exterior case 2 is supported so as to be able to shift between the first attitude (the position shown in FIGS. 3A and 4A) in which a predetermined pressing force is not applied on the ink bags 4 held in the housing space 40, and the second attitude (the position shown in FIGS. 3B and 4B) in which a force equal to or larger than the predetermined pressing force is applied on the ink bags 4 held in the housing space 40. Here, the predetermined pressing force is a force at a level where the seal of the outlets 4B breaks due to compression of the ink bags 4 as described later. It should be noted that the state of the exterior case 2 in the first attitude corresponds to a first state, and the state of the exterior case 2 in the second attitude corresponds to a second state. Thus, the first exterior portion P1 and the second exterior portion Q1 of the exterior case 2 are formed so as to be capable of changing states between the first state and the second state.

The front end parts of the outer case guides 25 are formed in a hook shape that is bent inwards. When the front end parts of the outer case guides 25 are caught at the front end parts of the inner case guides 35, the exterior case 2 becomes prevented from separating from the mount-side case 3.

External protrusions 24 are integrally formed on an outer surface 20B of the exterior case 2. The external protrusions 24 are disposed on both the outer surface 20B of the first exterior portion P1 and the outer surface 20B of the second exterior portion Q1. In more detail, in the exterior case 2, the external protrusions 24 are disposed at the outer surface 20B opposite to the first mount portion P2 and the second mount portion Q2 of the mount-side case 3. The external protrusions 24 protrude outward from the outer surface 20B, and are formed in a shape whose base is broad and whose front end has an obtuse angle. In the outer surface 20B, the external protrusions 24 are at positions on the back side of the inner projections 24A formed on the inner surface 20A of the exterior case 2. The external protrusions 24 extend outward the most from the outer surface 20B when the impact detection apparatus 10 is mounted on the cardboard box 51. Therefore, when the impact detection apparatus 10 is subjected to impact from the outer surface 20B side, the external protrusions 24 receive the impact force at one point.

Figure 5:
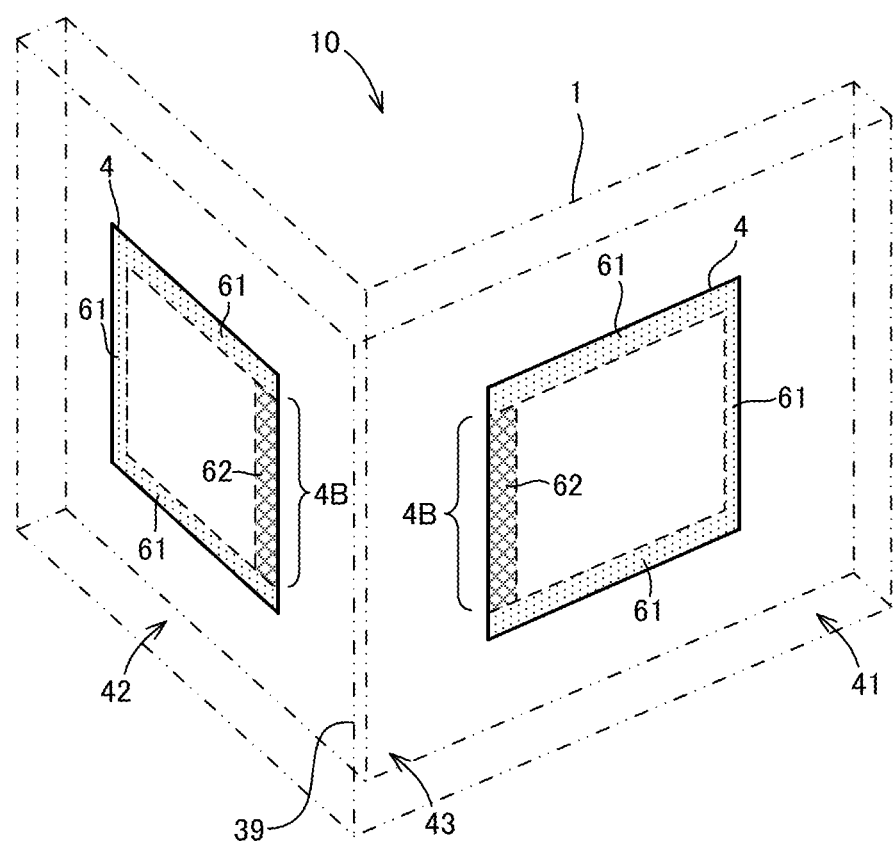
FIG. 5 is a perspective view that schematically shows an arrangement state of ink bags.

The ink bags 4 are for holding the ink 4A which is water soluble, and are formed in a generally square shape as shown in FIG. 5. The ink bags 4 are flat shaped bag-like packaging materials formed from resin sheets such as soft plastic, and their marginal parts are connected through thermal welding (heat sealing). The ink bags 4 are provided with the outlets 4B to allow the ink 4A to flow from the inside to the outside. The outlets 4B are formed on one part of the marginal parts of the ink bags 4. In more detail, each of the ink bags 4 is formed by attaching together two of the resin sheets having a rectangular shape so as to face each other, thermally welding three end edges 61 to have an opening formed by the remaining end edge 62 to function as the outlet 4B, injecting the colored ink 4A from the outlet 4B, and thermally welding the outlet 4B. At this moment, the strength of the thermal welding of the outlet 4B is configured to be lower than the strength of the thermal welding provided to the end edges 61, and is at a level where the seal created by the thermal welding breaks when the ink bag 4 is compressed by impact force (predetermined pressing force) applied to the external protrusion 24. In the present embodiment, as shown in FIG. 5, the ink bags 4 are held in the housing space 40 in a state where the outlets 4B are directed toward the connection space 43 connecting the first compartment 41 and the second compartment 42.

The absorbent bodies 5 are formed with an absorbent substance that can absorb the ink 4A, and are formed in a flat shape as shown in FIG. 4. The area size of the flat shape part of each of the absorbent bodies 5 is formed to be mostly identical to or broader than the area size of the flat shape part of each of the ink bags 4. Specific examples of the absorbent bodies 5 include water absorbent polymers, water absorbent papers, water absorbent resins, and water absorbent fibers. The absorbent bodies 5 are white in a state of not having the ink 4A absorbed, and are colored in the same color as the ink 4A when they absorb the ink 4A that has emerged from the ink bags 4. It should be noted that the absorbent bodies 5 are not limited to those described above, and may be any material or have any coloration as long as the absorbent bodies 5 change color due to coloring by the ink 4A.

The ink bags 4 and the absorbent bodies 5 are formed in a flat shape, and the ink bags 4 and the absorbent bodies 5 are stacked and housed in the housing space 40. Thus, the shape of the housing 1 and the impact detection apparatus 10 as a whole can be made thin. As a result, even when the cardboard boxes 51 that each have the impact detection apparatus 10 mounted thereon are arranged in a line, the gaps between the cardboard boxes 51 that are adjacent to each other can be reduced in size.

<Functions and Effects of Impact Detection Apparatus 10>

Next, with reference to FIGS. 3B, 4B, and 5, functions and effects of the impact detection apparatus 10 will be described. FIG. 3B shows, in a cross-sectional structure as viewed from the direction of arrows A-A in FIG. 2A, a state after state change when the impact detection apparatus 10 is subjected to an impact from the first exterior portion P1. FIG. 4B shows, in a cross-sectional structure as viewed from the direction of arrows B-B in FIG. 2B, a state after state change when the impact detection apparatus 10 is subjected to an impact from the first exterior portion P1. In the following, examples will be described in which, for example, an image forming apparatus such as a multifunctional peripheral is housed in the cardboard box 51 and the impact detection apparatus 10 is mounted near an upper corner of the cardboard box 51 as shown in FIG. 1.

When the cardboard box 51 is toppled sideways and tumbles, the surface where the impact detection apparatus 10 is mounted collides with a floor surface, and is subjected to a strong impact from the floor surface. If the first exterior portion P1 is subjected to the impact, the external protrusion 24 of the first exterior portion P1 receives the impact from tumbling in a concentrated manner. Due to the impact force, the first exterior portion P1 moves in a direction (backward in FIG. 1) to which the impact has been applied, and an attitude change from the first attitude to the second attitude occurs. At this moment, the first exterior portion P1 takes the second state. Simultaneously, the second exterior portion Q1 also slides backward. Thus, the whole exterior case 2 moves backward with respect to the mount-side case 3. As a result, the space in the first compartment 41 becomes small in the front-back direction 8. More specifically, the space between the inner projection 24A and the pressing portion 28 becomes narrow.

As described above, the ink bags 4 and the absorbent bodies 5 are arranged between the inner projections 24A and the pressing portions 28. Therefore, when the first compartment 41 becomes small, the ink bag 4 is compressed by the inner projection 24A and the pressing portion 28. At this moment, when a force equal to or larger than the predetermined pressing force is applied to the ink bag 4, the seal of the outlet 4B, which is the weakest part of the seal in the marginal part of the ink bag 4, breaks. Here, the predetermined pressing force is slightly smaller than a force at which an image forming apparatus inside the cardboard box 51 malfunctions, but larger than force generated when a transporter touches the cardboard box 51 or force applied through contact with other adjacent cardboards during transport. It should be noted that, even when a force equal to or larger than the predetermined pressing force is applied, the end edges 61 other than that of the outlet 4B will not be torn since seals at the end edges 61 are thermally welded stronger than the outlet 4B.

As described above, in the present embodiment, the ink bags 4 are held in the housing space 40 in a state where the outlets 4B are directed toward the connection space 43 connecting the first compartment 41 and the second compartment 42. Therefore, when a seal of the outlets 4B is broken, the ink 4A held inside flows out from the outlets 4B toward the connection space 43. Therefore, as shown in FIG. 4B with arrows, one portion of the ink 4A passes through the penetration hole 22A, flows from the first compartment 41 to the connection space 43, and flows in the second compartment 42 on the other side. Then, the ink 4A passes through the penetration hole 22A in the second compartment 42 and reaches the absorbent body 5 to be absorbed by the absorbent body 5 held in the second compartment 42. As a result, the absorbent body 5 colored with the ink 4A is visually recognized through the second exterior portion Q1. In addition, one portion of the ink 4A flows to the absorbent body 5 that is adjacent to the ink bag 4 in the first compartment 41 to be absorbed. As a result, the absorbent body 5 that is in the first compartment 41 and that has been colored by the ink 4A is visually recognized through the first exterior portion P1. Thus, both the absorbent bodies 5 of the first compartment 41 and the second compartment 42 change color in response to the ink 4A, and a user can confirm, through visual observation, the color change state of the absorbent bodies 5 from both the transparent first exterior portion P1 and second exterior portion Q1 of the exterior case 2.

Since the impact detection apparatus 10 is formed as described above, even without opening the cardboard box 51, impact applied to electronic equipment such as an image forming apparatus inside can be visually confirmed easily from outside the cardboard box 51. Furthermore, even when only one surface of the cardboard box 51 is subjected to an impact, not only color change of the absorbent body 5 can be visually observed from the first exterior portion P1 corresponding to that surface, but also color change of the absorbent body 5 can be visually observed from the second exterior portion Q1 corresponding to the other surface adjacent to that surface. As a result, the user can easily and quickly determine whether the electronic equipment inside has been subjected to an impact without comparing two surfaces of the cardboard box 51.

Modification of Embodiment

Configuration of Ink Bags 4

Figure 6A:
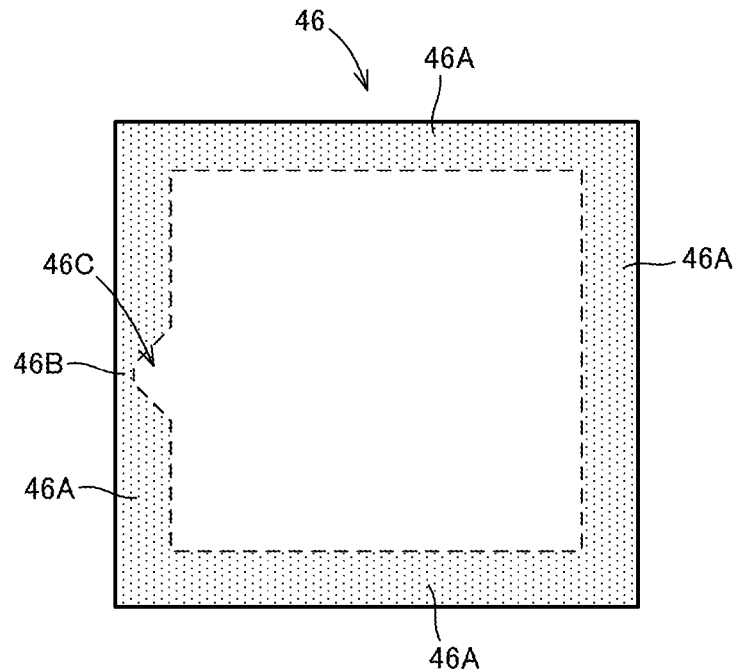
FIG. 6A and FIG. 6B are schematic diagrams that show another example of the ink bags.

In the embodiment described above, as shown in FIG. 5, although an example has been described in which the opening on the end edge 62 side is configured as the outlet 4B, and the outlet 4B has been thermally welded; the present disclosure is not limited to this example. For example, as shown in FIG. 6A, an ink bag 46 may be used whose end edges 46A are all joined through thermal welding at a constant width in a square, flat, and bag-like packaging material formed from a resin sheet, except for one end edge that has a small-width portion 46B where width of thermal welding is small. In this case, a domain 46C ranging from inside the ink bag 46 to the small-width portion 46B is an outlet of the present disclosure, and the ink bag 46 is housed in the housing space 40 in a state where the small-width portion 46B is directed toward the connection space 43.

Figure 6B:
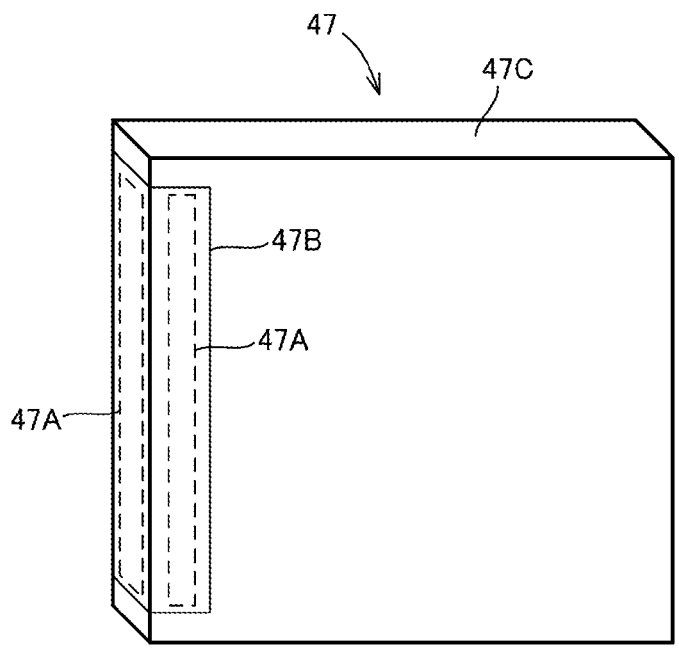

Furthermore, as shown in FIG. 6B, an ink container 47 may be used, including a flat and flexible case 47C that is made from a synthetic resin and that is obtained by forming, only on the connection space 43 side, penetration holes 47A through which the ink 4A can flow out and that are thermally welded with a resin sheet 47B made from soft plastic or the like. In this case, the penetration holes 47A correspond to the outlet of the present disclosure, and the ink container 47 is housed in the housing space 40 in a state where the penetration holes 47A are directed toward the connection space 43. In any of the configurations described above, when force that is equal to or larger than the predetermined pressing force is applied, the seal of the small-width portion 46B breaks or the seal created by the resin sheet 47B breaks.

(Shape of Housing 1)

In the embodiment described above, although the angle formed by the first mount portion P2 and the second mount portion Q2 of the mount-side case 3 is set to be an approximately right angle, the angle may be any angle conforming to the shape of the cardboard box 51 to be mounted on. As the angle formed by the first mount portion P2 and the second mount portion Q2, a predetermined angle equal to or smaller than 180 degrees may be used. In this case, the housing 1 and the exterior case 2 preferably have a cross-sectional shape with an angle conforming to the mount-side case 3. With this, the impact detection apparatus 10 can be mounted on a corner of the cardboard box 51 having a shape other than rectangular parallelepiped. For example, the impact detection apparatus 10 can be mounted on a corner of a triangular column when the angle is set to 60 degrees. Furthermore, the impact detection apparatus 10 can be mounted on a corner of a hexagonal column when the angle is 120 degrees.

(Modification of Connection Portion 39)

Furthermore, in the embodiment described above, although examples have been described regarding a form in which the connection portion 38 of the mount-side case 3 and the connection portion 39 of the exterior case 2 are fixed, the present disclosure is not limited to the examples. For example, the connection portions 38 and 39 of the impact detection apparatus 10 may be formed from a flexible material. Furthermore, the connection portions 38 and 39 may have a mechanism enabling rotation such as a hinge. In other words, it is conceivable to form the exterior case 2 and the mount-side case 3 such that the connection portions 38 and 39 are bendable. With such a configuration, the impact detection apparatus 10 can be mounted even when the corner of the cardboard box 51 has an angle other than an approximately right angle. In addition, when the connection portions 38 and 39 are straight and the first mount portion P2 and the second mount portion Q2 take a flat attitude, the impact detection apparatus 10 can be kept without taking much space.

In addition, although examples have been described in which the connection space 43 of the connection portions 38 and 39 is formed so as to enable liquid such as the ink 4A to flow between the first compartment 41 and the second compartment 42 through the penetration holes 22A formed on the second guides 22, the present disclosure is not limited to the examples. For example, a plurality of thin tubes or grooves connecting the first compartment 41 and the second compartment 42 may be formed at the connection portions 38 and 39. As a result, the ink 4A that had flowed out from the ink bag 4 at one compartment can be easily absorbed by the absorbent body 5 of the other compartment through capillary action etc.

(Modification of External Protrusions 24)

Furthermore, in the embodiment described above, although examples have been described in which one of the external protrusions 24 is disposed on each of the first exterior portion P1 and the second exterior portion Q1 of the exterior case 2, the present disclosure is not limited to the examples. For example, it is conceivable to form more than one of the external protrusions 24 on the first exterior portion P1 and the second exterior portion Q1 of the exterior case 2. As a result, the point where the impact is applied on the exterior case 2 can be dispersed. Thus, it becomes possible to prevent concentration of impact force exceeding the limit to a single point of the exterior case 2, and prevent damage to the exterior case 2. Obviously, the first exterior portion P1 and the second exterior portion Q1 of the exterior case 2 may have a configuration of not having the external protrusions 24 formed thereon. With this, the shape of the exterior case 2 can be made simple and manufacturing cost can be reduced.

Although examples have been described in which one of the external protrusions 24 is disposed near the center in the up-down direction 7 of each of the first exterior portion P1 and the second exterior portion Q1 of the exterior case 2, the present disclosure is not limited to the examples. For example, the external protrusions 24 may be disposed at the upper end parts of the first exterior portion P1 and the second exterior portion Q1 of the exterior case 2. With this, the exterior case 2 can easily receive an impact, and sensitivity against the impact can be increased.

(Modification of Inner Projections 24A)

Furthermore, in the embodiment described above, although examples of forming one of the inner projections 24A have been described, the present disclosure is not limited to the examples. For example, a plurality of the inner projections 24A may be formed. As a result, a part to which the pressing force generated by an impact is applied on the ink bag 4 can be dispersed. Therefore, momentum in which the ink 4A gushes out from the ink bag 4 can be weakened, and the ink 4A can be prevented from leaking from the impact detection apparatus 10. For example, a configuration of not having the inner projections 24A may also be used. With this, the shape of the exterior case 2 becomes simple and manufacturing cost can be reduced.

Although examples have been described in which one of the inner projections 24A presses the ink bag 4 near the center, the present disclosure is not limited to the examples. For example, it is conceivable to form the inner projections 24A at positions close to the connection portion 39 side. With this, the ink 4A that has flowed out from one of the ink bags 4 of the first compartment 41 and the second compartment 42 can easily flow to the other first compartment 41 or second compartment 42. Therefore, the ink 4A that has flowed out from one of the ink bags 4 can easily be absorbed by the other absorbent body 5.

(Modification of Transparent Exterior Case 2)

Although examples in which the exterior case 2 is completely transparent have been described, the present disclosure is not limited to the examples. For example, the exterior case 2 can conceivably have a linear transparent part formed in the front-back direction 8 and the right-left direction 9, but other parts can be completely black. With this, the color of the absorbent bodies 5 that have absorbed the ink 4A becomes prominent. Therefore, presence or absence of a collision can be easily confirmed. As a result, it becomes possible to reduce the amount of the ink 4A held in the ink bags 4, and reduce the amount of the absorbent bodies 5 by the amount corresponding to parts that are not visible.

(Modification of Mount Portion of Mount-Side Case 3)

Although examples have been described in which a double-sided tape is affixed to the first mount portion P2 and the second mount portion Q2 for mounting to the cardboard box 51, the present disclosure is not limited to the examples. For example, it is conceivable to directly apply an adhesive to the first mount portion P2 and the second mount portion Q2.

Although examples have been described in which the first mount portion P2 and the second mount portion Q2 are formed flat, the present disclosure is not limited to the examples. For example, the first mount portion P2 and the second mount portion Q2 may have bendable projections formed thereon, and mounting may be performed by penetrating the projections through a mounting portion of the cardboard box 51 and bending the projections inside the cardboard box 51.

Second Embodiment

In the following, a second embodiment of the present disclosure will be described. Here, what is different from the first embodiment is the configuration of the housing 1, and other parts have configurations identical to those in the first embodiment. Therefore, description of only the different parts will be provided and description of identical parts will be omitted.

Figure 7A:
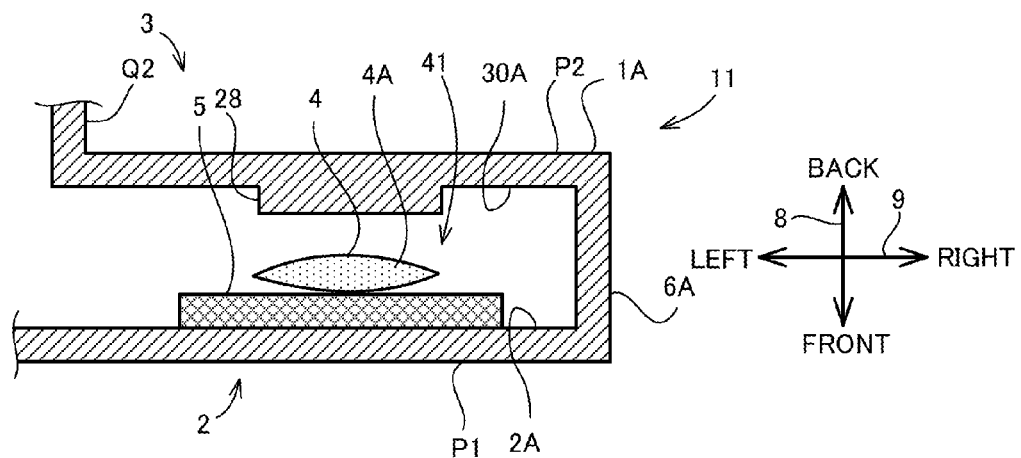
FIG. 7A and FIG. 7B are cross sectional views that schematically show the structure of an impact detection apparatus according to a second embodiment of the present disclosure.
Figure 7B:
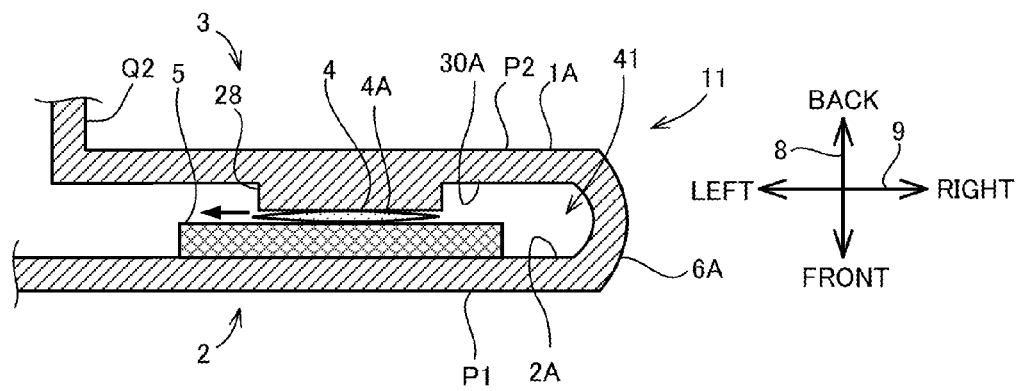

A configuration of an impact detection apparatus 11 will be described with reference to FIG. 7A and FIG. 7B. FIG. 7A is a cross sectional view that schematically shows a cross-sectional structure of the impact detection apparatus 11 from the first exterior portion P1 to the first mount portion P2. FIG. 7B is a cross sectional view showing a state after a state change when the impact detection apparatus 11 is subjected to an impact from the first exterior portion P1. It should be noted that diagrammatic representation of the second exterior portion Q1 and the second mount portion Q2 is omitted.

A housing 1A is an integrally formed L-shaped case made from plastic whose surface is transparent, and the pressing portion 28 is formed on an inner surface 30A on the side of the first mount portion P2 of the mount-side case 3. Although not diagrammatically represented, the pressing portion 28 is also formed on the second mount portion Q2. In addition, a lateral surface portion 6A disposed between the first exterior portion P1 and the first mount portion P2 of the housing 1A is flexible, and bends outwards when being subjected to external force. The ink bag 4 and the absorbent body 5 are arranged on an inner surface 2A of the first exterior portion P1 of the housing 1A. Because of the flexibility of the lateral surface portion 6A, the housing 1A is configured so as to be capable of changing states between the first state (the state shown in FIG. 7A) in which the predetermined pressing force is not applied on the ink bag 4, and the second state (the state shown in FIG. 7B) in which the predetermined pressing force is applied on the ink bag 4.

Since the impact detection apparatus 11 is formed in the manner described above, when the cardboard box 51 on which the impact detection apparatus 11 is mounted tumbles and is subjected to an impact to its lateral surface, the impact detection apparatus 11 is subjected to impact force from the first exterior portion P1 side of the housing 1A. With this impact, in the housing 1A, the lateral surface portion 6A bends outwards, the first exterior portion P1 approaches the first mount portion P2 side, and space of the first compartment 41 is reduced. As a result, the ink bag 4 arranged on the inner surface 2A of the housing 1A is pressed by the pressing portion 28, the seal of the outlet 4B of the ink bag 4 breaks, and the ink 4A flows toward the connection space 43 from the outlet 4B.

Also with the impact detection apparatus 11 as described above, the user can easily and quickly determine whether the electronic equipment inside has been subjected to an impact, by only visually observing one of the two surfaces of the cardboard box 51 having the impact detection apparatus 11 mounted thereon.

Third Embodiment

In the following, a third embodiment of the present disclosure will be described. Here, what is different from the first embodiment is the configuration of the housing 1, and other parts have configurations identical to those in the first embodiment. Therefore, description of only the different parts will be provided and description of identical parts will be omitted.

Figure 8A:
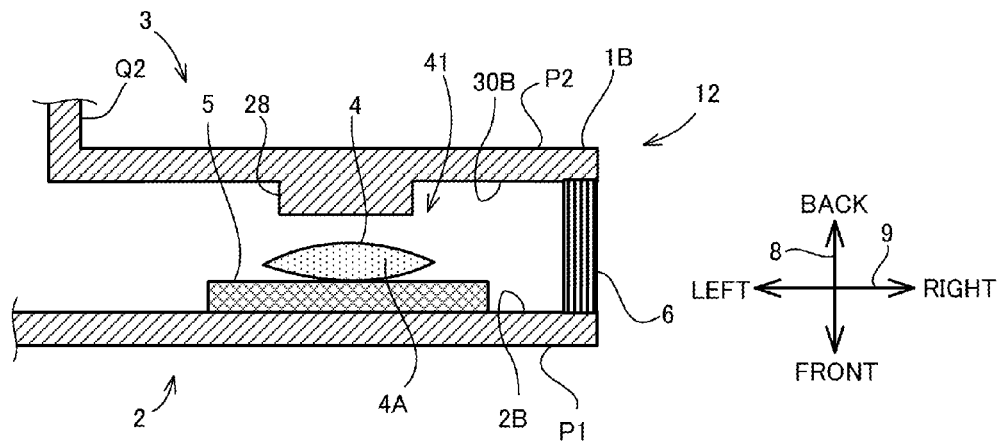
FIG. 8A and FIG. 8B are cross sectional views that schematically show a structure of an impact detection apparatus according to a third embodiment of the present disclosure.
Figure 8B:
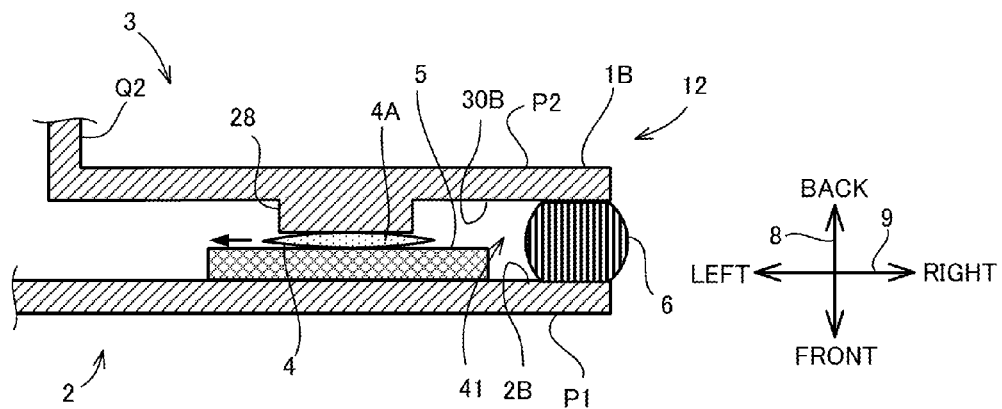

A configuration of an impact detection apparatus 12 will be described with reference to FIG. 8A and FIG. 8B. FIG. 8A is a cross sectional view that schematically shows a cross-sectional structure of the impact detection apparatus 12 from the first exterior portion P1 to the first mount portion P2. FIG. 8B is a cross sectional view showing a state after a state change when the impact detection apparatus 12 is subjected to an impact from the first exterior portion P1. It should be noted that diagrammatic representation of the second exterior portion Q1 and the second mount portion Q2 is omitted.

A housing 1B is an overall L-shaped case including the L-shaped mount-side case 3, the L-shaped exterior case 2, and a lateral wall portion 6 disposed between the mount-side case 3 and the exterior case 2. The pressing portion 28 is formed on an inner surface 30B on the side of the first mount portion P2 of the mount-side case 3. Although not diagrammatically represented, the pressing portion 28 is also formed on the second mount portion Q2. In addition, the lateral wall portion 6 disposed between the first exterior portion P1 and the first mount portion P2 of the housing 1B is a connecting member formed with an elastic material such as rubber that fills and eliminates the gap between the exterior case 2 and the mount-side case 3. The lateral wall portion 6 is elastic, and expands and contracts when being subjected to external force. The ink bag 4 and the absorbent body 5 are arranged on an inner surface 2B of the first exterior portion P1 of the housing 1B. Because of the elasticity of the lateral wall portion 6, the housing 1B is configured so as to be capable of changing states between the first state (the state shown in FIG. 8A) in which the predetermined pressing force is not applied on the ink bag 4, and the second state (the state shown in FIG. 8B) in which the predetermined pressing force is applied on the ink bag 4.

Since the impact detection apparatus 12 is formed in the manner described above, when the cardboard box 51 on which the impact detection apparatus 12 is mounted tumbles and is subjected to an impact to its lateral surface, the impact detection apparatus 12 is subjected to impact force from the first exterior portion P1 side of the housing 1B. With this impact, in the housing 1B, the lateral wall portion 6 contracts, the first exterior portion P1 approaches the first mount portion P2 side, and space of the first compartment 41 is reduced. As a result, the ink bag 4 arranged on the inner surface 2B of the housing 1B is pressed by the pressing portion 28, the seal of the outlet 4B of the ink bag 4 breaks, and the ink 4A flows toward the connection space 43 from the outlet 4B.

Also with the impact detection apparatus 12 as described above, the user can easily and quickly determine whether the electronic equipment inside has been subjected to an impact, by only visually observing one of the two surfaces of the cardboard box 51 having the impact detection apparatus 12 mounted thereon.

Fourth Embodiment

In the following, a fourth embodiment of the present disclosure will be described. Here, what is different from the first embodiment is the configuration of the housing 1, and other parts have configurations identical to those in the first embodiment. Therefore, description of only the different parts will be provided and description of identical parts will be omitted.

Figure 9A:
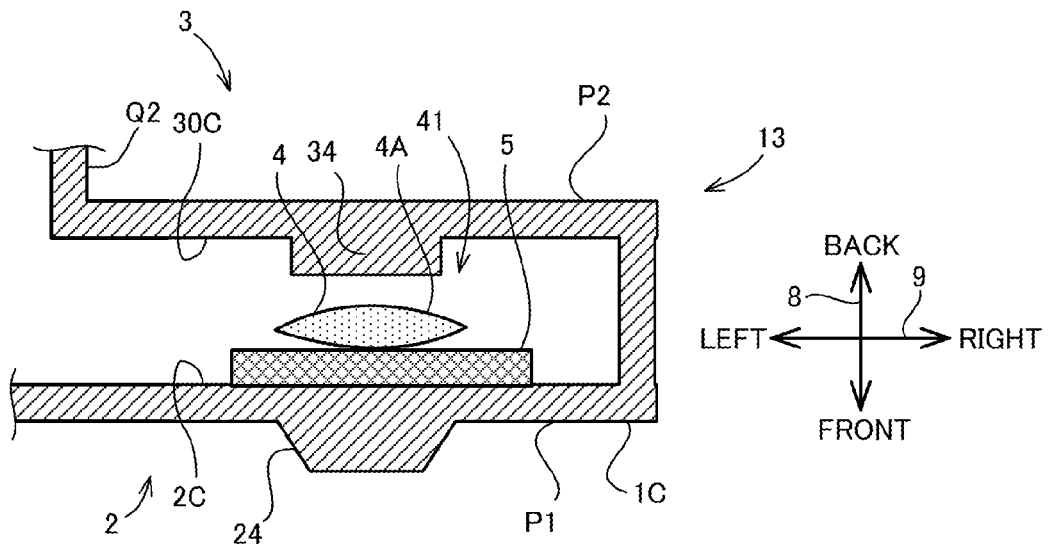
FIG. 9A and FIG. 9B are cross sectional views that schematically show a structure of an impact detection apparatus according to a fourth embodiment of the present disclosure.
Figure 9B:
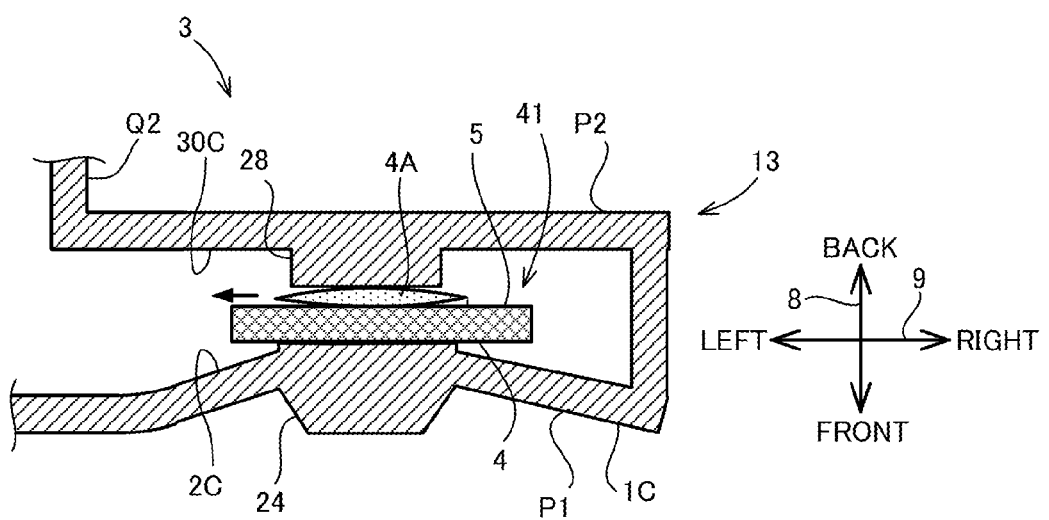

A configuration of an impact detection apparatus 13 will be described with reference to FIG. 9A and FIG. 9B. FIG. 9A is a cross sectional view that schematically shows a cross-sectional structure of the impact detection apparatus 13 from the first exterior portion P1 to the first mount portion P2. FIG. 9B is a cross sectional view showing a state after a state change when the impact detection apparatus 13 is subjected to an impact from the first exterior portion P1. It should be noted that diagrammatic representation of the second exterior portion Q1 and the second mount portion Q2 is omitted.

A housing 1C is an integrally formed L-shaped case made from plastic whose surface is transparent, and includes the L-shaped mount-side case 3 and the L-shaped exterior case 2. The pressing portion 28 is formed on an inner surface 30C on the side of the first mount portion P2 of the mount-side case 3. Although not diagrammatically represented, the pressing portion 28 is also formed on the second mount portion Q2. The external protrusion 24 is disposed on the first exterior portion P1. Since the first exterior portion P1 is flexible, when force is applied on the external protrusion 24 from outside, the first exterior portion P1 is concaved so as to buckle toward the side of the first compartment 41 of the housing 1C. The ink bag 4 and the absorbent body 5 are arranged on an inner surface 2C of the first exterior portion P1 of the housing 1C. Because of the flexibility of the first exterior portion P1, the housing 1C is configured so as to be capable of changing states between the first state (the state shown in FIG. 9A) in which the predetermined pressing force is not applied on the ink bag 4, and the second state (the state shown in FIG. 9B) in which the predetermined pressing force is applied on the ink bag 4.

Since the impact detection apparatus 13 is formed in the manner described above, when the cardboard box 51 on which the impact detection apparatus 13 is mounted tumbles and is subjected to an impact to its lateral surface, the impact detection apparatus 13 is subjected to impact force from the first exterior portion P1 side of the housing 1C. With this impact, the first exterior portion P1 is concaved as if being buckled, the state changes from the first state to the second state, the first exterior portion P1 approaches the first mount portion P2 side, and space of the first compartment 41 is reduced. As a result, the ink bag 4 arranged on the inner surface 2C of the housing 1C is pressed by the pressing portion 28, the seal of the outlet 4B of the ink bag 4 breaks, and the ink 4A flows toward the connection space 43 from the outlet 4B.

Also with the impact detection apparatus 13 as described above, the user can easily and quickly determine whether the electronic equipment inside has been subjected to an impact, by only visually observing one of the two surfaces of the cardboard box 51 having the impact detection apparatus 13 mounted thereon.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An impact detection apparatus comprising
a first detection portion and a second detection portion mounted at a corner portion of a mounting target along two adjacent lateral surfaces, and a connection portion,
wherein the first detection portion and the second detection portion each include:
a solution container configured to store a colored solution therein, and having an outlet enabling the colored solution to flow out when being subjected to a predetermined pressing force;
a solution absorption portion capable of absorbing the colored solution that has flowed out from the outlet;
a mount-surface portion mounted on one of the two lateral surfaces; and
an exterior portion that is disposed on the mount-surface portion, that forms, together with the mount-surface portion therebetween, a housing space housing the solution container and the solution absorption portion, and that has a transparent portion at least one part thereof,
wherein the connection portion connects the respective mount-surface portions of the each the first detection portion and the second detection portion at a predetermined angle,
wherein the exterior portions are formed to be capable of changing states between a first state in which the predetermined pressing force is not applied on the solution containers when not being subjected to external force, and a second state in which the predetermined pressing force is applied on the solution containers when being subjected to the external force, and the colored solution that has flowed out from the outlet of one of the solution containers due to being subjected the predetermined pressing force in the second state is absorbed by one of the solution absorption portions, and the one of the solution absorption portions colored by the colored solution is visually recognized through the transparent portion.

2. The impact detection apparatus according to claim 1, wherein
the solution containers of the first detection portion and second detection portion are each housed in the housing space such that the outlet is directed toward the connection portion, and, when the exterior portion of one of the first detection portion or the second detection portion is in the second state, the colored solution that has flowed out from the outlet of the solution container housed in the housing space of the one in the second state passes through the connection portion, reaches the housing space of the other one of the first detection portion or the second detection portion, and is absorbed by the solution absorption portion housed in the housing space of the other one to cause the solution absorption portion colored by the colored solution to be visually recognized through the transparent portion of the exterior portion of the other one.

3. The impact detection apparatus according to claim 2, wherein, in each of the solution containers, the outlet is disposed at one portion of marginal parts of a plastic bag.

4. A packaged body comprising:
a package box acting as the mounting target configured to package electronic equipment; and
the impact detection apparatus according to claim 3, mounted on the package box.

5. A packaged body comprising:
a package box acting as the mounting target configured to package electronic equipment; and
the impact detection apparatus according to claim 2, mounted on the package box.

6. The impact detection apparatus according to claim 1, wherein the predetermined angle is an approximately right angle.

7. A packaged body comprising:
a package box acting as the mounting target configured to package electronic equipment; and
the impact detection apparatus according to claim 6, mounted on the package box.

8. The impact detection apparatus according to claim 1, wherein the mount-surface portions are each formed so as to be bendable around the connection portion.

9. A packaged body comprising:
a package box acting as the mounting target configured to package electronic equipment; and
the impact detection apparatus according to claim 8, mounted on the package box.

10. The impact detection apparatus according to claim 1, wherein
the solution containers and the solution absorption portions are formed in a flat shape, and an area size of a flat part of each of the solution absorption portions is larger than an area size of a flat part of each of the solution containers, and
the housing spaces house the solution containers and the solution absorption portions in a stacked manner.

11. A packaged body comprising:
a package box acting as the mounting target configured to package electronic equipment; and
the impact detection apparatus according to claim 6, mounted on the package box.

12. A packaged body comprising:
a package box acting as the mounting target configured to package electronic equipment; and
the impact detection apparatus according to claim 1, mounted on the package box.

* * * * *